(12) United States Patent
Strock

(10) Patent No.: US 11,149,744 B2
(45) Date of Patent: Oct. 19, 2021

(54) TURBINE ENGINE SEAL FOR HIGH EROSION ENVIRONMENT

(71) Applicant: United Technologies Corporation, Farmington, CT (US)

(72) Inventor: Christopher W. Strock, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 421 days.

(21) Appl. No.: 15/708,711

(22) Filed: Sep. 19, 2017

(65) Prior Publication Data
US 2019/0085865 A1    Mar. 21, 2019

(51) Int. Cl.
| | |
|---|---|
| F01D 5/20 | (2006.01) |
| F04D 29/52 | (2006.01) |
| F04D 29/08 | (2006.01) |
| F04D 29/32 | (2006.01) |
| F02C 7/04 | (2006.01) |
| F01D 11/12 | (2006.01) |
| F01D 5/00 | (2006.01) |
| F02C 3/04 | (2006.01) |
| F01D 5/06 | (2006.01) |

(52) U.S. Cl.
CPC ........... *F04D 29/526* (2013.01); *F01D 5/005* (2013.01); *F01D 11/122* (2013.01); *F02C 7/04* (2013.01); *F04D 29/083* (2013.01); *F04D 29/321* (2013.01); *F01D 5/06* (2013.01); *F02C 3/04* (2013.01); *F05D 2220/32* (2013.01); *F05D 2230/80* (2013.01); *F05D 2240/11* (2013.01); *F05D 2300/2112* (2013.01); *F05D 2300/2118* (2013.01); *F05D 2300/226* (2013.01); *F05D 2300/2261* (2013.01); *F05D 2300/2262* (2013.01); *F05D 2300/2263* (2013.01); *F05D 2300/6032* (2013.01)

(58) Field of Classification Search
CPC .... F04D 29/526; F04D 29/083; F04D 29/321; F02C 7/04; F02C 3/04; F01D 5/06; F05D 2220/32
USPC ....................................................... 415/713.4
See application file for complete search history.

(56) References Cited

U.S. PATENT DOCUMENTS

| | | | |
|---|---|---|---|
| 3,053,694 A * | 9/1962 | Daunt | F01D 11/122 106/626 |
| 3,092,306 A * | 6/1963 | Eder | B05D 7/16 277/411 |

(Continued)

FOREIGN PATENT DOCUMENTS

| | | |
|---|---|---|
| EP | 0187612 A2 | 7/1986 |
| EP | 3239465 A1 | 11/2017 |

(Continued)

OTHER PUBLICATIONS

European Search Report dated Feb. 20, 2019 issued in corresponding European Patent Application No. 18195565.9.

*Primary Examiner* — Hung Q Nguyen
*Assistant Examiner* — Anthony Donald Taylor, Jr.
(74) *Attorney, Agent, or Firm* — Bachman & LaPointe, P.C.

(57) ABSTRACT

A seal for a gas turbine engine including an interlayer between a substrate and an abradable layer, the interlayer containing abrasive particles of which at least some abrasive particles protrude out of an interface that abuts the abradable layer.

22 Claims, 1 Drawing Sheet

(56) References Cited

U.S. PATENT DOCUMENTS

| | | | | |
|---|---|---|---|---|
| 3,880,550 A * | 4/1975 | Corey | .................... | F01D 11/12 277/415 |
| 3,975,165 A * | 8/1976 | Elbert | .................... | B32B 18/00 428/550 |
| 4,291,089 A * | 9/1981 | Adamovic | ............. | B22F 1/025 427/217 |
| 4,422,648 A * | 12/1983 | Eaton | .................... | F01D 11/12 277/415 |
| 4,566,700 A * | 1/1986 | Shiembob | .............. | C23C 28/00 277/415 |
| 5,024,884 A * | 6/1991 | Otfinoski | ................. | B22F 3/26 415/174.4 |
| 5,076,897 A * | 12/1991 | Wride | ................... | B24D 99/00 205/110 |
| 5,705,231 A | 1/1998 | Nissley et al. | | |
| 5,780,146 A * | 7/1998 | Mason | ................. | C04B 20/002 428/325 |
| 5,952,110 A * | 9/1999 | Schell | .................... | F01D 11/12 205/109 |
| 6,780,458 B2 * | 8/2004 | Seth | ....................... | C23C 24/04 427/201 |
| 7,510,370 B2 * | 3/2009 | Strangman | ............. | C23C 26/02 415/173.4 |
| 8,266,801 B2 * | 9/2012 | Clark | ...................... | B22F 7/04 29/889.7 |
| 8,287,611 B2 * | 10/2012 | You | ......................... | B24D 3/28 51/293 |
| 8,435,098 B2 * | 5/2013 | You | ....................... | B24D 11/00 451/526 |
| 10,012,095 B2 * | 7/2018 | Stratton | ................ | C22C 19/058 |
| 2003/0126800 A1 * | 7/2003 | Seth | ....................... | B24D 18/00 51/293 |
| 2003/0132119 A1 * | 7/2003 | Ohara | ..................... | F01D 11/12 205/109 |
| 2003/0176156 A1 * | 9/2003 | Braunschweig | ......... | B24D 3/28 451/526 |
| 2003/0183529 A1 * | 10/2003 | Ohara | ....................... | C23C 6/00 205/109 |
| 2004/0091627 A1 * | 5/2004 | Ohara | .................. | B23K 1/0018 427/402 |
| 2004/0096318 A1 * | 5/2004 | Ohara | ..................... | C25D 15/02 415/173.4 |
| 2006/0285972 A1 * | 12/2006 | Nicoll | ..................... | C04B 35/48 415/173.1 |
| 2008/0178536 A1 * | 7/2008 | Johnson | ................... | B24D 3/06 51/298 |
| 2011/0164963 A1 * | 7/2011 | Taylor | ....................... | C23C 4/06 415/173.4 |
| 2014/0147242 A1 * | 5/2014 | Ghasripoor | ........... | F16J 15/445 415/1 |
| 2016/0084102 A1 * | 3/2016 | Pabla | .................... | F01D 11/122 415/173.4 |

FOREIGN PATENT DOCUMENTS

| | | | | |
|---|---|---|---|---|
| GB | 2399777 | * | 9/2004 | ............. F01D 11/12 |
| GB | 2399777 A | | 9/2004 | |

* cited by examiner

TURBINE ENGINE SEAL FOR HIGH EROSION ENVIRONMENT

BACKGROUND

The present disclosure relates generally to an abradable seal, and more particularly, to an abradable outer air seal for a turboshaft engine.

Gas turbine engines include a compressor that compresses air, a combustor that ignites the compressed air, and a turbine across which the compressed air is expanded. The expansion of the combustion products drives the turbine, which in turn drives rotation of the compressor.

Turboshaft engines, which are often used in rotary wing aircraft applications, are typically smaller than turbofan aircraft engines and are often subject to prolonged operations in dusty environments. These factors often require an erosion resistant abradable blade outer air seal in the compressor. The relatively small engine diameter makes efficiency and stability sensitive to tip clearance, while the harsh operating environment tends to erode the abradable coatings at undesirable rates. In order to increase efficiency, a clearance between the tips of the compressor and the outer diameter of the flowpath is relatively small. This ensures that a minimum amount of air passes between the tips and the outer diameter. The abradable outer air seal further reduces the tip clearance and the tips are designed to, at times, rub against the seal. The rubbing wears the abradable material of the seal. The tips then have a reduced tip clearance relative to the idealized geometry formed in the abradable surface.

SUMMARY

A seal for a gas turbine engine according to one disclosed non-limiting embodiment of the present disclosure can include a substrate; an abradable layer; and an interlayer between the substrate and the abradable layer, the interlayer containing abrasive particles of which at least some abrasive particles protrude out of an interface adjacent to the abradable layer.

A further embodiment of the present disclosure may include that the abrasive particles are faceted.

A further embodiment of the present disclosure may include that the abrasive particles are alumina and/or zirconia or alumina-based and/or zirconia based.

A further embodiment of the present disclosure may include that the abrasive particles have an average particle size of 200-220 mesh.

A further embodiment of the present disclosure may include that the abrasive particles have an average particle size of 15-45 micrometer (0.015-0.045 mm)

A further embodiment of the present disclosure may include that the interlayer has an interlayer hardness that is higher than an abradable layer hardness and higher than a substrate hardness.

A further embodiment of the present disclosure may include that the interlayer is formed of a metal matrix composite having a metallic matrix and hard particles dispersed in the metallic matrix, the metallic matrix formed of a metal selected from the group consisting of nickel, cobalt, nickel chromium, cobalt chromium, and combinations thereof.

A further embodiment of the present disclosure may include that the hard particles are selected from the group consisting of carbides, oxides, nitrides, borides, and combinations thereof.

A further embodiment of the present disclosure may include that hard particles are selected from the group consisting of tungsten carbide, chromium carbide, and combinations thereof.

A further embodiment of the present disclosure may include that the abradable layer is 0.005-0.02 inches (about 0.13-0.5 mm) thick.

A further embodiment of the present disclosure may include that the abradable layer is 0.009 inches (about 2.3 mm) thick.

A further embodiment of the present disclosure may include that the interlayer is thicker than the abradable layer.

A seal for a gas turbine engine according to one disclosed non-limiting embodiment of the present disclosure can include a compressor section comprising a plurality of circumferentially-spaced blades having abrasive blade tips; and a seal positioned radially outwards of the blade tips, the seal comprising: a substrate having a substrate hardness; an abradable layer having an abradable layer hardness; and an interlayer between the substrate and the abradable layer, the interlayer having an interlayer hardness that is higher than the abradable layer hardness and higher than the substrate hardness, the interlayer thicker than the abradable layer and containing abrasive particles of which at least some abrasive particles protrude out of an interface that abuts the abradable layer.

A further embodiment of the present disclosure may include that the gas turbine engine is a turboshaft engine.

A further embodiment of the present disclosure may include that the compressor section has a maximum diameter to the blade tips of 23 centimeters.

A further embodiment of the present disclosure may include that a combustor section; and a turbine section connected to the compressor section, the compressor section has a number of compressor stages that is no more than three, and the turbine section has a number of turbine stages that is no more than two.

A further embodiment of the present disclosure may include an inlet duct directed radially with respect to a central rotational axis of the compressor section.

A further embodiment of the present disclosure may include that the abrasive blade tips abrade the abradable layer in response to a severe erosion event.

A further embodiment of the present disclosure may include that the at least some abrasive particles that protrude out of the interface that abuts the abradable layer abrade the tips of the abrasive blade tips.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
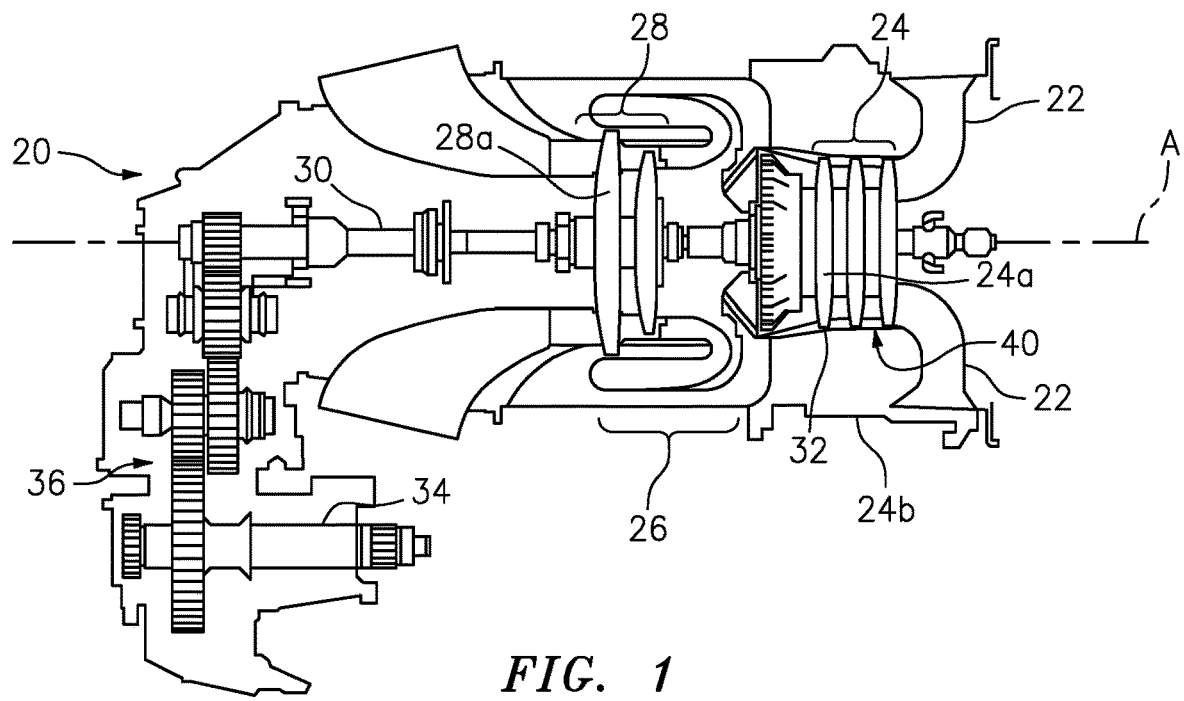
FIG. 1 illustrates an example turboshaft gas turbine engine.

FIG. 1 schematically illustrates a gas turbine engine 20. In this example, the engine 20 is a turboshaft engine, such as for a helicopter. The engine 20 includes an inlet duct 22, a compressor section 24, a combustor section 26, and a turbine section 28.

The compressor section 24 is an axial compressor and includes a plurality of circumferentially-spaced blades 24a. In this example engine, the compressor section 24 includes three stages of blades 24a and the maximum diameter to tips 24b of the blades 24a is 23 centimeters. Similarly, the turbine section 28 includes circumferentially-spaced turbine blades 28a. Here, the turbine section 28 has two stages. The relatively low number of stages—here, three in the compressor section 24 and two in the turbine section 28—differs from the higher numbers of stages typically found in turbofan engines, which drive propulsor fans.

The compressor section 24 and the turbine section 28 are mounted on a main shaft 30 for rotation about an engine central longitudinal axis A relative to an engine static structure 32 via several bearing systems (not shown). The main shaft 30 drives an output shaft 34 through a gearbox 36.

During operation, the compressor section 24 draws air through the inlet duct 22. In this example, the inlet duct 22 opens radially relative to the central longitudinal axis A. The compressor section 24 compresses the air, and the compressed air is then mixed with fuel and burned in the combustor section 26 to form a high pressure, hot gas stream. The hot gas stream is expanded in the turbine section 28, which rotationally drives the main shaft 30, compressor section 28, gearbox 36, and output shaft 34. Although not shown, the main shaft 30 may also drive a generator or other accessories through an accessory gearbox.

The engine 20 also includes a seal system 40 in the compressor section 24 around the blades 24a. Such a seal system may be referred to as a blade outer air seal. The seal system 40 serves to provide a minimum clearance around the tips 24b of the blades 24a, to limit the amount of air that escapes around the gap at the tips 24b.

Although turbofan engines ingest some amount of dust, such engines are typically not designed for highly dusty environments. Engines such as the engine 20 are subject to operating in highly dusty environments during hover, takeoff, and landing. In such an environment, the compressor section 24 can be subject to unusually high erosion conditions from the dust. The erosion conditions have potential to rapidly erode seals, particularly abradable outer air seals, which would increase the gap at the tips of the blades. The efficiency and stability of small diameter engines, such as those of the size of engine 20, may be especially sensitive to the tip gap. While this could be circumvented by avoiding use of abradable outer air seals, the consequence would be a relatively large tip gap that reduces engine efficiency. As will be discussed below, the seal system 40 is abradable, yet also limits the effect of erosion.

Figure 2:
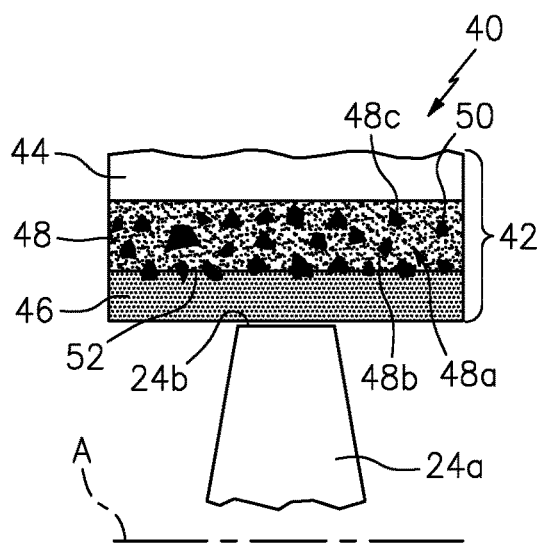
FIG. 2 illustrates an example of a seal for the gas turbine engine.

FIG. 2 illustrates a representative portion of a seal 42 of the seal system 40. As will be appreciated, the seal 42 may be an arc segment, a full ring, a split ring that is mounted around the blades 24a in similar fashion as known blade outer air seals, or an integration into an engine casing. The seal 42 includes a substrate 44, an abradable layer 46, and an interlayer 48. The substrate 44 may, for example, be a ceramic matrix composite (CMC), titanium such as Ti-6Al4V, an iron alloy such as 400 series stainless steel or a nickel alloy such as IN718. The interlayer 48 resists erosion. The abradable layer 46 fills the gap between the blade tips 24b during normal operation and the most extreme radially outboard allowed (or occurring) blade tip 24b position. These values will vary depending on design.

In this example, the interlayer 48 is in contact with and between the substrate 44 and the abradable layer 46. The substrate 44 has a substrate hardness, the abradable layer 46 has an abradable layer hardness, and the interlayer 48 has an interlayer hardness. The interlayer hardness is higher than the substrate hardness and higher than the abradable layer hardness. For example, the interlayer 48 hardness is more than about 20% harder than the substrate 44. In further examples, the interlayer hardness is over 600 Vickers Hardness (HV), specifically over 750 Vickers Hardness, and most specifically over 1000 HV.

The effect of these hardnesses is that the interlayer 48 has a higher erosion resistance than the substrate 44 and the abradable layer 46. Higher erosion resistance can be erosion resistance under the conditions found during operation of the engine 20. These conditions can be simulated or estimated using comparative erosion testing.

The tips 24b of the blades 24a are abrasive with regard to the abradable layer 46. When two components are in rubbing contact, at least at times, one of the components may wear. The term "abradable" refers to the one of the two components that wears, while the other component is "abrasive" and does not wear or wears less. Thus, when the tips 24b of the blades 24a rub against the abradable layer 46, the abradable layer 46 wears, whereas the tips 24b will not wear or will wear less. The word "abrasive" thus also implies that there is or can be contact with an abradable component. The tips 24b of the blades 24 may include an abrasive coating or abrasive element, or may be formed of a material that is abrasive to the abradable layer 46.

Figure 3:
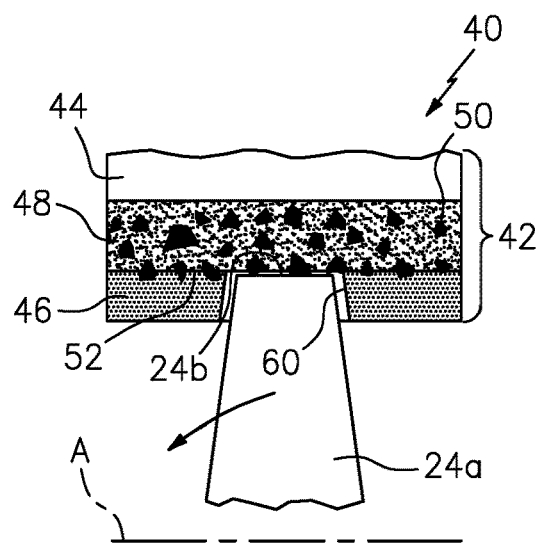
FIG. 3 illustrates the seal after rubbing with compressor blades.

The interlayer 48 includes abrasive particles 50 embedded therein. The abrasive particles 50 protrude out of an interface 52 that abuts the abradable layer 46. That is, the abrasive particles 50 extend from the interface 52 of the interlayer 48 and protrude into the abradable layer 46. Once the abradable layer 46 is abraded away, at least a portion of at least some of the abrasive particles 50 protrude from the interface 52 (FIG. 3). The abrasive particles 50 that protrude from the interface 52 operate as an abrasive to the tips 24b of the blades 24a once the abradable layer 46 is eroded away.

With reference to FIG. 3, at times during rotation of the blades 24a, the tips 24b may rub against the abradable layer 46 and wear a trench 60 into the abradable layer 46. The trench 60 reduces tip clearance and thus facilitates efficient engine operation. The abradable layer 46 is also subject to erosion and, over time or in response to a severe erosion event such as a dust storm, may erode away. The eroding away of the abradable layer 46 may progressively open the tip gap. However, once eroded away, the interlayer 48 and the abrasive particles 50 serve as a "stop" to further erosion. The interlayer 48 thus limits the effect of erosion on opening of the tip gap to preserve at least a minimum tip clearance even when the abradable layer 46 is lost. Additionally, the interlayer 48 protects the substrate 44 from erosion and may serve as a bond layer to enhance adhesion of the abradable layer 46 to the substrate 44.

The interlayer 48 is formed of a metal matrix composite ("MMC") 48a, which is shown in FIG. 2. The MMC 48a includes a metallic matrix 48b (white area) and hard particles 48c (dark areas) dispersed through the metal matrix 48b. In one example, the metallic matrix 48b is formed of nickel, cobalt, nickel chromium, cobalt chromium, or combinations thereof, and the hard particles are carbides, oxides, borides or combinations thereof. One boride example includes chromium diboride ($CrB_2$).

In further examples, the metallic matrix 48b is a cobalt- or nickel-based alloy with molybdenum, chromium, aluminum, silicon and low carbon content. Examples include alloy grades available as Triballoy® (E. I. du Pont de Nemours and Company). In further examples, the hard particles include tungsten carbide, chromium carbide, or combinations thereof. Several additional examples include (matrix/particles) cobalt/tungsten carbide, nickel-chromium/chromium carbide ($Cr_3C_2$), cobalt/chromium carbide ($Cr_3C_2$), nickel-chromium/tungsten carbide, niobium/chromium diboride ($CrB_2$), Triballoy® T800/alumina-40titania. In one further example, the hard particles have a composition, by weight, of 38.5-43.5% Cr, 10-13% Ni, 2.9-4.1% Co, 7.7-8.5% C, less than 0.5% Fe, and a balance W (available from Oerlikon Metco as Woka 7500 series). In further examples, the desired hardness may be achieved without hard particles if a hard alloy is used. The alloy grades available as Triballoy® (E. I. du Pont de Nemours and Company) are examples of hard alloys that may be used without hard particles.

The abrasive particles 50 may be faceted to provide sharp corners that facilitate efficient "cutting" of the blade tips 24b with low cutting forces, which lowers frictions and, in turn, contributes to lowering the amount of heat generated. The abrasive particles 50 may be alumina and/or zirconia or alumina-based and/or zirconia-based (e.g., at least 50% alumina and/or zirconia by weight or alumina or zirconia as a largest by weight component). More specifically, the abrasive particles 50 may be a zirconia having an average particle size of 200-220 mesh. In one example, the abrasive particles 50 may be a cast, dense, fused alumina-titania-zirconia abrasive such as Duralum® ATZ II W from Washington Mills (US) Inc., North Grafton, Mass. that has approximately 40% tetragonal zirconia with titania distributed throughout the individual alumina grains. Another specific example is Metco 105NS from Sulzer Metco (US) Inc., Westbury, N.Y. A characteristic particle size and morphology is 15-45 micrometer (0.015-0.045 mm) 98 wt % pure alumina particles produced by fusing and crushing.

The abradable layer 46 may be formed of a metallic alloy. For example, the metallic alloy can be an aluminum alloy, copper alloy, nickel alloy, cobalt alloy, nickel-cobalt alloy, or combinations thereof. The abradable layer 46 may be porous and/or may have a dispersed internal solid lubricant. The metallic alloy of the abradable layer 46 may also include a corrosion inhibitor, especially if the layer is porous, as moisture can infiltrate and increase the potential for corrosion. The corrosion inhibitor may include, but is not limited to, anodic corrosion inhibitors, such as zinc molybdate, and cathodic corrosion inhibitors such as cerium citrate. Another example corrosion inhibitor may include trivalent chromate coatings or treatments, such as grades TCP-HF and TCP-NP available as Chemeon® (Chemeon Surface Technology, LLC).

In a further example, the abradable layer 46 is formed of an aluminum alloy and the aluminum alloy has a composition, by weight, of about 88% aluminum and about 12% silicon. In another example, the abradable layer 46 is formed of an intermetallic copper alloy. For instance, the intermetallic copper alloy is $Cu_5Al$, $Cu_8AlFe$, or $Cu_{38}Ni$. Further examples may include, by weight, up to 67% nickel, copper as the next most abundant element, and alloy elements of iron, manganese, carbon, aluminum and silicon.

Another example copper alloy includes, by weight, at least 35% of copper, 30-45% combined of nickel, cobalt, and iron, with combined iron and cobalt at most one-third of the nickel, 2-8% aluminum, and 5-15% chromium. Any of these examples may also include a solid lubricant, such as hexagonal boron nitride or polymer fillers, and/or fugitive pore formers such as polyester and methyl methacrylate.

In some embodiments, the abradable layer 46 can be 0.005-0.02 inches (about 0.13-0.5 mm) thick. In a more specific embodiment, the abradable layer 46 can be about 0.009 inches (about 0.23 mm) thick. The abrasive content of the bond layer allows the "hard wall" position of the interlayer 48 interface to be closer to the blade tips 24b because the abrasive particles 50 will cut a little length off of the longest blades 24a. Even a mil or two may be important where hard wall clearance is on the order of 0.009 inches (about 0.23 mm). The abrasive particles 50 thus also facilitate a more uniform outer diameter of the blades 24a.

The relatively thinner abradable layer 46 and relatively thicker interlayer 48 provides a relatively smaller diameter interface 52 closer to the blade tips 24b such that less abradable material needs to be abraded. This not only further limits tip clearance after erosion depletes the abradable layer 46, but the abrasive particles 50 operate to evenly grind the tips 24b of the blades 24a to provide a more consistent rotor disk outer diameter for a tight average tip clearance. Further, the potential of the tip clearance opening due to abradable transfer to the blade tips 24b and "record grooving" is limited by the abrasive particles 50. In summary, stability, efficiency, and power capability are improved.

The seal 42 is also repairable, which is likely not a characteristic of other seals that would be subjected to severe erosion conditions. For example, since the interlayer 48 stops erosion, even if the abradable layer 46 erodes away, the substrate 44 remains intact and can be reused. In contrast, for a seal that is not configured for such erosion conditions, erosion is likely to occur down to the substrate, thereby rendering repair impossible or at least uneconomical.

Figure 4:
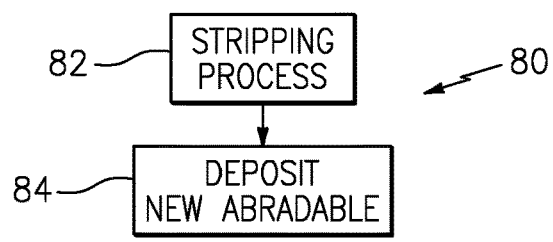
FIG. 4 illustrates an example method of repairing a seal.

FIG. 4 illustrates an example method 80 for repairing the seal 42. The method 80 includes a stripping step 82 and a deposition step 84. The stripping step 82 involves subjecting the seal 42 to a stripping process that removes the abradable layer 46 and the interlayer 48 from the substrate 44. The stripping process is not harmful to the substrate 44. As an example, the stripping process may include water jet stripping, chemical stripping (with an acid), mechanical stripping (with an abrasive media), or a combination of these.

Following the stripping step 82, a new interlayer 48 and new abradable layer 46 is deposited in the deposition step 84, to form a refurbished seal. The refurbished seal will appear substantially similar to the seal 42, shown in FIG. 2. As examples, the abradable layer 46 can be deposited by plasma spray, high velocity oxy-fuel deposition, or other spray or deposition techniques known for application of abradable materials.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the figures. Moreover, selected features of one example embodiment may be combined with selected features of other example embodiments.

The elements described and depicted herein, including in flow charts and block diagrams throughout the figures may show logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A seal for a gas turbine engine, comprising:
   a substrate;
   an abradable layer; and
   an interlayer between the substrate and the abradable layer, the interlayer thicker than the abradable layer and containing abrasive particles of which at least some abrasive particles protrude out of the interlayer and into the abradable layer but do not extend beyond the abradable layer, wherein the interlayer has an interlayer hardness that is higher than an abradable layer hardness and higher than a substrate hardness.

2. The seal as recited in claim 1, wherein the abrasive particles are faceted.

3. The seal as recited in claim 1, wherein the abrasive particles are alumina and/or zirconia or alumina-based and/or zirconia-based.

4. The seal as recited in claim 1, wherein the abrasive particles have an average particle size of 200-220 mesh.

5. The seal as recited in claim 1, wherein the abrasive particles have an average particle size of 15-45 micrometer (0.015-0.045 mm).

6. The seal as recited in claim 1, wherein the interlayer is formed of a metal matrix composite having a metallic matrix formed of a metal selected from the group consisting of nickel, cobalt, nickel chromium, cobalt chromium, and combinations thereof.

7. The seal as recited in claim 6, wherein the abrasive particles are selected from the group consisting of carbides, oxides, nitrides, borides, and combinations thereof.

8. The seal as recited in claim 6, wherein the abrasive particles are selected from the group consisting of tungsten carbide, chromium carbide, and combinations thereof.

9. The seal as recited in claim 1, wherein the abradable layer is 0.005-0.02 inches (about 0.13-0.5 mm) thick.

10. The seal as recited in claim 1, wherein the abradable layer is 0.009 inches (about 0.23 mm) thick.

11. A gas turbine engine, comprising:
    a compressor section comprising a plurality of circumferentially-spaced blades having abrasive blade tips; and
    a seal positioned radially outwards of the blade tips, the seal comprising:
    a substrate having a substrate hardness;
    an abradable layer having an abradable layer hardness; and
    an interlayer between the substrate and the abradable layer, the interlayer having an interlayer hardness that is higher than the abradable layer hardness and higher than the substrate hardness, the interlayer thicker than the abradable layer and containing abrasive particles of which at least some abrasive particles protrude out of the interlayer and into the abradable layer, wherein the at least some abrasive particles that protrude out of the interlayer abrade tips of the abrasive blade tips in response to a severe erosion event.

12. The gas turbine engine as recited in claim 11, wherein the gas turbine engine is a turboshaft engine.

13. The gas turbine engine as recited in claim 11, wherein the compressor section has a maximum diameter to the blade tips of 23 centimeters.

14. The gas turbine engine as recited in claim 11, further comprising:
    a combustor section; and
    a turbine section connected to the combustor section, the turbine section has a number of turbine stages that is no more than two.

15. The gas turbine engine as recited in claim 14, further comprising an inlet duct directed radially with respect to a central rotational axis of the compressor section.

16. The gas turbine engine as recited in claim 11, wherein the abrasive particles protrude out of the interlayer and into the abradable layer but do not extend beyond the abradable layer.

17. The gas turbine engine as recited in claim 11, wherein the abrasive particles operate to grind the tips of the blades.

18. The gas turbine engine as recited in claim 11, wherein the abrasive particles operate to grind the tips of the blades to provide a more consistent rotor disk outer diameter for a tight average tip clearance.

19. A method for tip clearance control for a gas turbine engine, comprising:

abrading an abradable layer of a seal in response to an erosion event, the seal containing abrasive particles of which at least some abrasive particles protrude out of an interlayer and into the abradable layer, wherein the at least some abrasive particles that protrude out of the interlayer abrade tips of abrasive blade tips.

20. The method as recited in claim 19, wherein the interlayer has an interlayer hardness that is higher than an abradable layer hardness and higher than a substrate hardness.

21. The method as recited in claim 19, wherein the abrasive particles operate to grind the tips of the blades after the tips abrade through the abradable layer.

22. The method as recited in claim 21, wherein the abrasive particles operate to grind the tips of the blades to provide a more consistent rotor disk outer diameter for a tight average tip clearance.

* * * * *